United States Patent [19]

Karanian

[11] Patent Number: 5,167,249
[45] Date of Patent: Dec. 1, 1992

[54] VARIABLE-THROAT CHIN INLET HIGH MACH NUMBER MISSILE APPLICATION

[75] Inventor: Arthur J. Karanian, Wethersfield, Conn.

[73] Assignee: United Technologies Corporation, Hartford, Conn.

[21] Appl. No.: 312,605

[22] Filed: Oct. 19, 1981

[51] Int. Cl.$^5$ .............................................. F02C 7/042
[52] U.S. Cl. .................................. 137/15.1; 244/53 B
[58] Field of Search ............................ 60/270.1, 39.29; 137/15.1, 15.2; 244/53 B

[56] References Cited

U.S. PATENT DOCUMENTS

| 3,011,307 | 12/1961 | Edelfelt | 60/39.29 |
| 3,080,707 | 3/1963 | Vetter | 137/15.1 |
| 3,265,331 | 8/1966 | Miles | 244/53 B |
| 4,132,240 | 1/1979 | Frantz | 137/15.1 |
| 4,372,505 | 2/1983 | Syberg | 244/53 B |

OTHER PUBLICATIONS

*Variable-Geometry Intake;* Flight; May 18, 1967; p. 812.

Primary Examiner—Stephen C. Bentley
Attorney, Agent, or Firm—Norman Friedland

[57] ABSTRACT

Variable chin-inlet for a missile wherein radially movable compression ramps vary the throat area so as to compress flow in the plane of the upstream boundary layer growth.

3 Claims, 2 Drawing Sheets

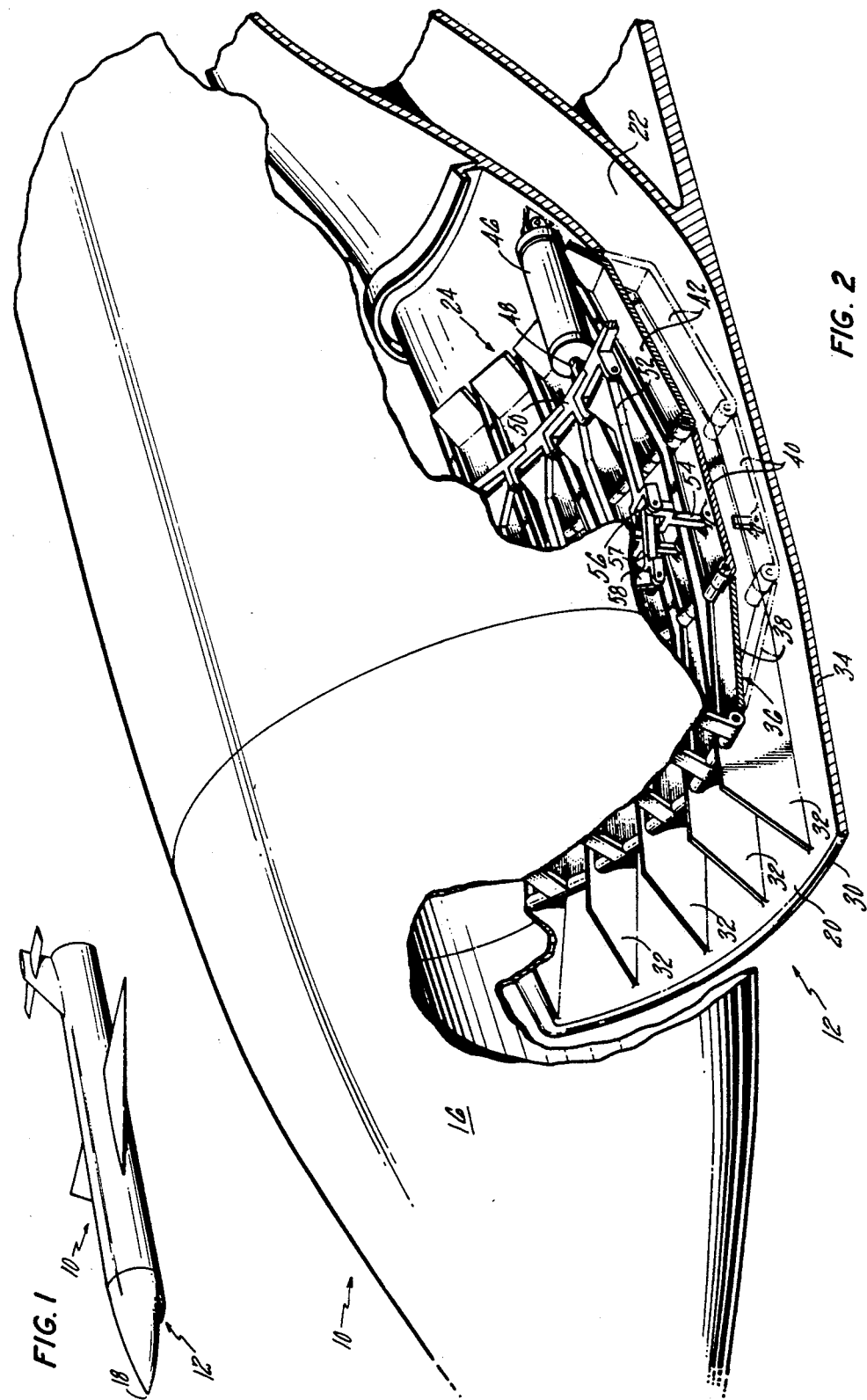

VARIABLE-THROAT CHIN INLET HIGH MACH NUMBER MISSILE APPLICATION

DESCRIPTION

1. Technical Field

This invention relates to inlets for missiles for high Mach number application and particularly for chin inlets adapted for rocket ramjet missile use.

2. Background Art

It is always of paramount importance to obtain the optimum range, thrust level and maneuver capability for a missile propulsion system and each element of this system contributes to the overall efficacy of the missile. This invention is particularly concerned with an air inlet system which has been already defined for a given missile. The improvement consists of varying the throat of the chin inlet in a unique, but specific manner in order to optimize the pressure recovery attendant the shock occurring at the inlet.

As is well known, it is desirable to reduce the Mach number that the inlet sees at its throat so as to minimize shock losses and maximize pressure recovery. For the high Mach number missiles, it is also well known that the length of the inlet throat section is proportional to the throat height of the inlet and the smaller the throat height the smaller the overall length of the inlet throat section. For the sake of weight, obviously it is desirable to keep the overall length of the inlet throat section at a minimum. An example of a scheme for achieving this end is disclosed in U.S. Pat. No. 3,080,707 granted to E. E. Vetter on Mar. 12, 1963, in which is disclosed a variable inlet that is made variable by movable vertical panels or walls that vary the inlet throat.

I have found that it is more desirable to utilize horizontal panels or compression ramps disposed generally concentric to the inlet wall because it compresses the flow in the plane of the upstream boundary layer growth. The movable compression ramps reduce the passage height in a direction which augments mixing of the boundary layer with the inviscid flow and thereby reduce the physical length of the shock train; i.e., the characteristic inlet dimension at the inlet throat which affects shock train length is the throat height in the radial direction. This approach will permit a shorter length inlet while providing good shock train containment and, concomitantly, good inlet pressure recovery. The inlet in accordance with this invention is sectioned in circumferential two-dimensional open-ended channels defined by circumferentially and parallely spaced fixed wedge splitters. These splitters support the vertically movable compression ramps that span the distance between walls. This defines a two-dimensional flow channel. It is further contemplated that the splitters support the cowl.

DISCLOSURE OF INVENTION

An object of this invention is to provide an improved inlet for a chin type inlet configured rocket/ramjet engine. The characteristics of the inlet is to vary the throat area in a plane coincident with the plane of the upstream boundary layer growth.

A feature of this invention is to segment the inlet into circumferentially spaced open-ended channels communicating inlet air admitted into the chin inlet with the combustor and varying the throat area in a direction planar to the cowl so that it compresses the flow in the plane of the upstream boundary layer growth. Each radial wall of the channel defines a radial fixed-wedge splitter that is spaced slightly downstream of the lip of the inlet.

Another feature of this invention is that the radial fixed-wedge splitters are disposed parallel to each adjacent splitter and define therewith a two-dimensional flow channel. The splitters serve the dual purpose of supporting the cowl and support the movable ramps located therebetween.

Other features and advantages will be apparent from the specification and claims and from the accompanying drawings which illustrate an embodiment of the invention.

BRIEF DESCRIPTION OF DRAWINGS

FIG. 1 is a perspective view of a chin inlet missile;

FIG. 2 is a partial view partly in elevation, schematic and section illustrating the invention.

BEST MODE FOR CARRYING OUT THE INVENTION

Figure 3:
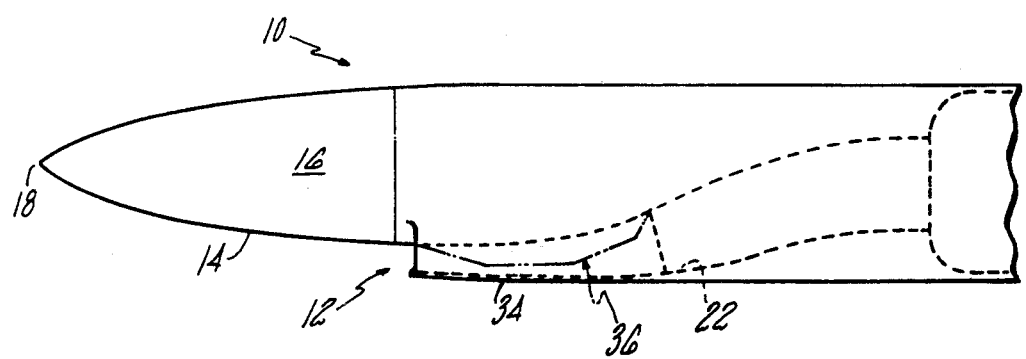
FIG. 3 is a partial view, partly in section and in schematic showing the chin inlet configuration.

While this description describes the variable-geometry inlet to be continuously variable, it is within the scope of this invention that the geometry can be changed to provide any prescribed number of discrete positions. It will also be appreciated that to one skilled in the art that although only five channels are shown and this configuration envisions having eight channels, any number of channels may be selected for any given application. In selecting the number of channels, one would take into consideration the circumferential wrap angle of the "smile-shaped" chin inlet, the effect on splitter leading edge angles and the mechanical complexity and volume of the drive system.

It is to be understood that while the particular mechanism for effectuating the internal contraction is shown as the preferred embodiment any other means for executing this invention is contemplated within the scope thereof. Suffice it to say that the essential aspect of this invention is that the splitters define circumferentially spaced two-dimensional flow panels. The ramp segments between splitters are movable in the radial direction to change the throat flow area in the radial direction. This serves to compress the flow in the plane of the upstream boundary layer growth and consequently augments mixing of the boundary layer with the inviscid flow and thereby reduce the physical length of the shock train. The net result of this concept not only permits a shorter length inlet, it, also enhances good shock train containment with a significant improvement in inlet pressure recovery.

As noted from FIGS. 1 and 3, the missile generally illustrated by reference numeral 10 can take any suitable aerodynamic profile and includes at its forward end the chin inlet generally illustrated by reference numeral 12. The chin inlet, as is known, includes the portion of the undersurface 14 of the missile body 16 extending from the leading end 18 at the most forward tip of the missile, through the segmented slot 20, and the duct 22 extending from the leading edge of slot 20 to the engine's combustor. As can be seen from a view of FIG. 3, the underside surface of missile from the leading end 18 upstream of slot 20 is contoured to define a compression ramp for compressing the air prior to entering the slot 20.

The portion of duct 22 adjacent the slot 20 is adjustable by the mechanism generally illustrated by reference numeral 24 and positions a ramp system for varying the geometry of the inlet's throat to be illustrated hereinbelow. As can be seen in FIG. 2, the inlet geometry upstream of the cowl lip 30 remains fixed and the portion slightly downstream of the cowl lip 30 is divided into a number of flow passages by radial fixed-wedge splitters 32. These splitters 32 serve the dual purpose of providing structural support to the cowl 34 and providing parallel surfaces for support of moveable ramp 36 located between adjacent splitters 32. The moveable ramp 36 comprises three generally flat shaped plate members 38, 40 and 42 pivotally connected to form a variable ramp that adjusts the height of the throat and hence changes the throat flow area in the radial direction. This serves to compress the flow in the plane of the upstream boundary layer growth. The moveable compression ramps 38, 40 and 42 reduce the passage height in a direction which augments mixing of the boundary layer with the inviscid flow and thereby reduce the physical length of the shock train. By virtue of this invention, the length of the inlet is shorter than heretofore designs while providing good inlet pressure recovery.

The ramp actuation system comprises an actuator 46 suitably supported at one end having a positioning rod 48 connected to a segmented unison ring 50. Each ramp between splitters carries the same linkage system and for the sake of convenience and simplicity only one will be described herein. Unison ring 50 pivotally supports link 52 which is pivotally connected to the vertical connecting link 54 through the bifurcated connection generally illustrated at 56. Link 54 is bifurcated and pivotally supports link 57 that is in turn pivotally supported to the fixed support member 58. Hence, rectilinear movement of rod 48 serves to move the ramps radially to change the height of the throat as illustrated in phantom.

It should be understood that the invention is not limited to the particular embodiments shown and described herein, but that various changes and modifications may be made without, departing from the spirit and scope of this novel concept as defined by the following claims.

I claim:

1. An inlet system for a missile having an air breathing power plant and including a chin inlet having an opening spanning a portion of the circumference of the missile body spaced from the forward end of the missile, a plurality of splitters spaced from the forward edge of said opening, adjacent splitters defining parallel juxtaposed fixed wall means for defining a plurality of open ended constant width passages leading air from said opening to said power plant, a variable area compression ramp disposed between each of said juxtaposed walls for defining therewith a variable area throat section, means for positioning said compression ramp in a radial direction to change the height of said throat section so as to compress the flow of air passing therethrough in the plane of the upstream boundary layer growth of said air being fed to said power plant whereby the shock train length is substantially contained and the length of said inlet is minimized.

2. An inlet system as defined by claim 1 including an actuator, a unison ring connected to said actuator for positioning each of said compression ramps synchronously.

3. An inlet as in claim 1 including a cowl surrounding said opening and said splitter supporting said cowl and being spaced upstream relative to the flow of air in said opening from the lip of said cowl.

* * * * *